(12) United States Patent
Abrams et al.

(10) Patent No.: US 6,303,064 B1
(45) Date of Patent: Oct. 16, 2001

(54) PROCESS AND APPARATUS FOR MAKING A LEAKPROOF PLASTIC CONTAINER BY COMPLETELY EJECTING FROM A MOLD AND TRANSFERRING TO A CAP CLOSING STATION

(75) Inventors: Robert S. Abrams, Albany; John Belfance, Fonda, both of NY (US); Branko Tisma, Elk Grove Village, IL (US)

(73) Assignee: Capitol Vial, Inc., Fultonville, NY (US)

( * ) Notice: Subject to any disclaimer, the term of this patent is extended or adjusted under 35 U.S.C. 154(b) by 0 days.

(21) Appl. No.: 09/490,635

(22) Filed: Jan. 24, 2000

(51) Int. Cl.⁷ ............................. B29C 45/42; B29C 65/78
(52) U.S. Cl. ............................. 264/238; 29/700; 53/484; 264/328.1; 264/336; 425/556; 425/317; 425/444
(58) Field of Search ................................. 264/238, 328.1, 264/334, 336; 425/556, 317, 444; 29/800, 801, 796, 700; 53/484, 491; 220/810

(56) References Cited

U.S. PATENT DOCUMENTS

| | | |
|---|---|---|
| 2,814,404 | 11/1957 | Towns . |
| 3,282,477 | 11/1966 | Henchert . |
| 3,470,930 | 10/1969 | Jurczenia . |
| 3,592,349 | 7/1971 | Baugh . |
| 3,786,982 | 1/1974 | Rakes et al. . |
| 3,838,960 | 10/1974 | Lovejoy . |
| 3,900,550 | 8/1975 | Oliver et al. . |
| 3,910,740 * | 10/1975 | Rees . |
| 3,938,875 * | 2/1976 | Rees . |
| 3,966,386 | 6/1976 | Beyer-Olsen et al. . |
| 4,204,824 | 5/1980 | Paradis . |
| 4,351,630 | 9/1982 | Hayberg et al. . |
| 4,377,247 | 3/1983 | Hazard et al. . |
| 4,420,089 | 12/1983 | Walker et al. . |
| 4,422,998 * | 12/1983 | Sorensen .............................. 264/335 |
| 4,619,373 | 10/1986 | Galer . |
| 4,655,363 | 4/1987 | Neat . |
| 4,713,219 | 12/1987 | Gerken et al. . |
| 4,717,034 | 1/1988 | Mumford . |
| 4,754,656 | 7/1988 | Charm . |
| 4,783,056 | 11/1988 | Abrams et al. . |
| 4,807,425 | 2/1989 | Abrams et al. . |
| 4,812,116 | 3/1989 | Abrams et al. . |
| 4,813,570 | 3/1989 | Pontoppidan . |
| 4,860,907 | 8/1989 | Sondal . |
| 4,955,513 | 9/1990 | Bennett . |
| 5,012,941 | 5/1991 | Abrams et al. . |
| 5,020,683 | 6/1991 | Strassheimer . |

(List continued on next page.)

FOREIGN PATENT DOCUMENTS

PCT/US93/
12490    12/1993    (WO) .

OTHER PUBLICATIONS

Expert Witness Report of Dr. Steven J. Grossman Pursuant to Fed.R.CIV.P.26(b)(4)(a)(i)–Capitol Vial, Inc. v Triple S. Plastics, Inc. dated Dec. 30, 1998.

*Primary Examiner*—Jill L. Heitbrink
(74) *Attorney, Agent, or Firm*—Dreier & Baritz LLP

(57) ABSTRACT

A process and apparatus for forming a leakproof plastic container by completely ejecting from a mold and then transferring to a cap closing station. The process includes the steps of injecting a molten plastic material into a mold cavity and then opening the mold and ejecting the body and cap completely from the mold. Subsequently, the body and cap are gravity fed to a collection device and then transferred to a cap closing station. In the cap closing station, the body and cap are sealed before the material is fully set to form a leakproof seal.

8 Claims, 2 Drawing Sheets

U.S. PATENT DOCUMENTS

| | | |
|---|---|---|
| 5,108,029 | 4/1992 | Abrams et al. . |
| 5,133,470 | 7/1992 | Abrams et al. . |
| 5,169,374 | 12/1992 | Abrams et al. . |
| 5,199,635 | 4/1993 | Abrams et al. . |
| 5,219,320 | 6/1993 | Abrams et al. . |
| 5,269,430 | 12/1993 | Schlaupitz et al. . |
| 5,429,699 | 7/1995 | Abrams et al. . |
| 5,441,150 | 8/1995 | Ma . |
| 5,474,177 | 12/1995 | Abrams et al. . |
| 5,513,768 | 5/1996 | Smith . |
| 5,575,399 | 11/1996 | Intini . |
| 5,624,528 | 4/1997 | Abrams et al. . |
| 5,667,094 | 9/1997 | Rapchak et al. . |
| 5,723,085 | 3/1998 | Abrams et al. . |

\* cited by examiner

PROCESS AND APPARATUS FOR MAKING A LEAKPROOF PLASTIC CONTAINER BY COMPLETELY EJECTING FROM A MOLD AND TRANSFERRING TO A CAP CLOSING STATION

FIELD OF THE INVENTION

The present invention relates to an apparatus and process for forming a leakproof seal between a cap and a body of a container after the container is completely ejected from a mold and then transferred to a cap closing station.

BACKGROUND OF THE INVENTION

A plastic body and cap of the type to which the present invention relates is generally an injection-molded plastic container that has a plastic cap adapted to seal the body closed with a leakproof seal. Such body and cap are, for example, the vial that may be used to collect a test sample of milk or urine, or to ship sterile water, or other types of containers having caps. The cap is typically integrally connected to the body.

U.S. Pat. No. 4,783,056 relates to a method for accomplishing sealing of a cap onto a vial including a mold with several moving parts in which the vial may be molded and sealed in the same apparatus. This method of forming and sealing an aseptic vial eliminate the additional step of sealing the vial under aseptic conditions because the sealing is done directly in the mold while the vial is still hot enough to maintain the necessary pliability and sterility of the vial. However, this method requires the use of a mold which has moving parts for closing and sealing the cap on the vial and does not easily facilitate the transfer of a liquid to the container prior to sealing.

U.S. Pat. No. 5,723,085 relates to a process and apparatus for making a leakproof cap and body assembly. This process discloses a method of injecting a molten material into a mold cavity, separating the mold cavity, engaging at least the body with a robotic arm while the assembly is in the mold and moving the cap and body assembly with the robotic arm into a capping device while the body and cap are at a temperature at which the material is not fully set. The body is then sealed by moving the cap into engagement with the body to form a leakproof seal.

SUMMARY OF THE INVENTION

The present invention relates to a process and apparatus for making a leakproof plastic container. The process relates to a process for forming and sealing a cap onto a body with a leakproof seal after the body and cap assembly are completely ejected from a mold, and the body and cap assembly are transferred to a cap closing station.

More specifically, a more complete appreciation of the present invention and many of the attendant advantages thereof will be readily understood by reference to the following description when considered in connection with the accompanying drawings within.

Figure 1:
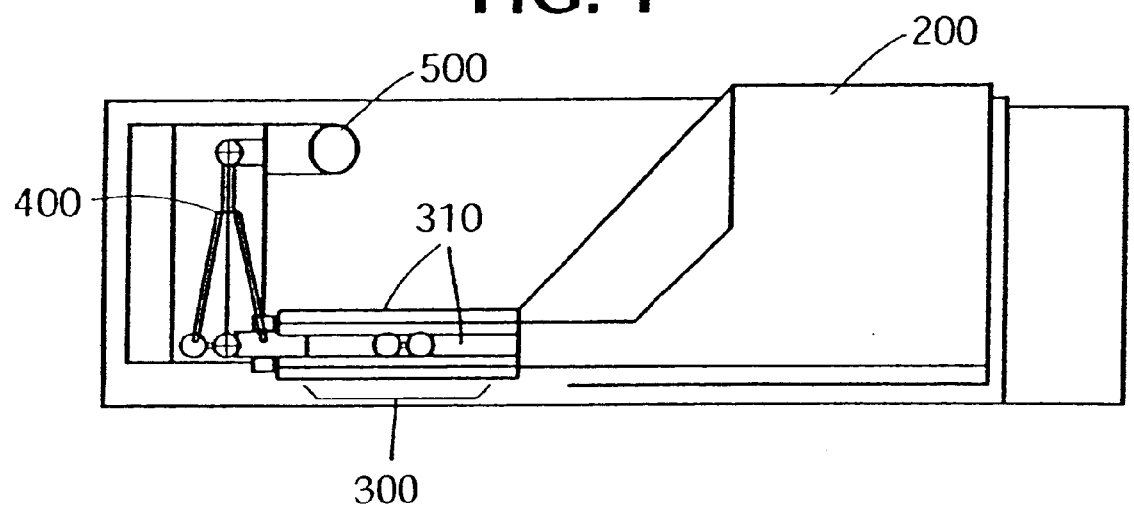
FIG. 1 is a top view of one embodiment of the present invention showing a hopper, conveyor and a cap closing station.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE PRESENT INVENTION

The present invention relates to a process and apparatus for making a leakproof plastic body and cap. The term "leakproof" means that the body and cap (i.e., the container) passes the blue crystal dye test. The blue crystal dye test is a visual test to detect leaks between the body and cap. A container "passes" the blue crystal dye test if the white paper, in which the container is placed on, does not visually change color (i.e. The white paper does not become contaminated with the blue crystal dye liquid from the container). The blue crystal dye test procedure consists of the following : (a) the blue crystal dye liquid is prepared by adding one teaspoon of blue crystal dye powder to one gallon of alcohol and then thoroughly mixing the solution; (b) the blue crystal dye liquid is poured into the container (i.e. a sufficient amount of the dye liquid must be added so, when the container is placed upside down, the entire seal area must be covered); (c) the container is closed by applying, sufficient downward pressure on the cap to completely and evenly seat the cap on the body; (d) the container is placed upside down (ie. inverted) on the white paper at room temperature; and (e) after 4 hours, the white paper is inspected to determine if the white paper is contaminated with the blue crystal dye liquid.

The phrase "not fully set" means that: 1) the plastic material forming the body and cap are at a temperature between the glass transition temperature (Tg) and the melting point (Tm) of the material; 2) the cap and body are rigid enough to retain their shape and be moved without damage; and 3) the sealing surfaces on the cap and body are warm enough to conform to each other to make the required leakproof seal, yet cool enough so that the cap can be opened and closed without sticking. The glass transition temperature (Tg) is the point below which plastic behaves as glass does. Below Tg, the thermoplastic will be very strong, fully rigid (or fully set), and brittle. At or above Tg, the plastic is not as strong or rigid as glass, and is not brittle. And finally, above Tm, the plastic is a fluid melt. Tg and Tm values are widely published for commercial plastic materials, and typically appear in texts on plastic materials. For example, as reported in the *Polymer Handbook*, $2^{nd}$ Edition. J. Wiley (1975) at V-24, the Tg of polypropylene is listed at −18° C. (0.4° F.), with the Tm at +171° C. (+340° F.). The vial temperature may be measured either on the sealing surface of the vial (assuming sufficient pyrometer contact area), or on the outer sidewall of the vial near the sealing surface to ensure sufficient pyrometer contact area.

The apparatus and process of the present invention can be used to make a variety of bodies including bottles, vials, spouts or any other container requiring a leakproof seal. The invention will be described in the drawings and description with respect to a vial. However, it should be understood that the process and apparatus of the invention applies equally to any container requiring a leakproof plastic seal and, as such, is not limited to vials.

Figure 3:
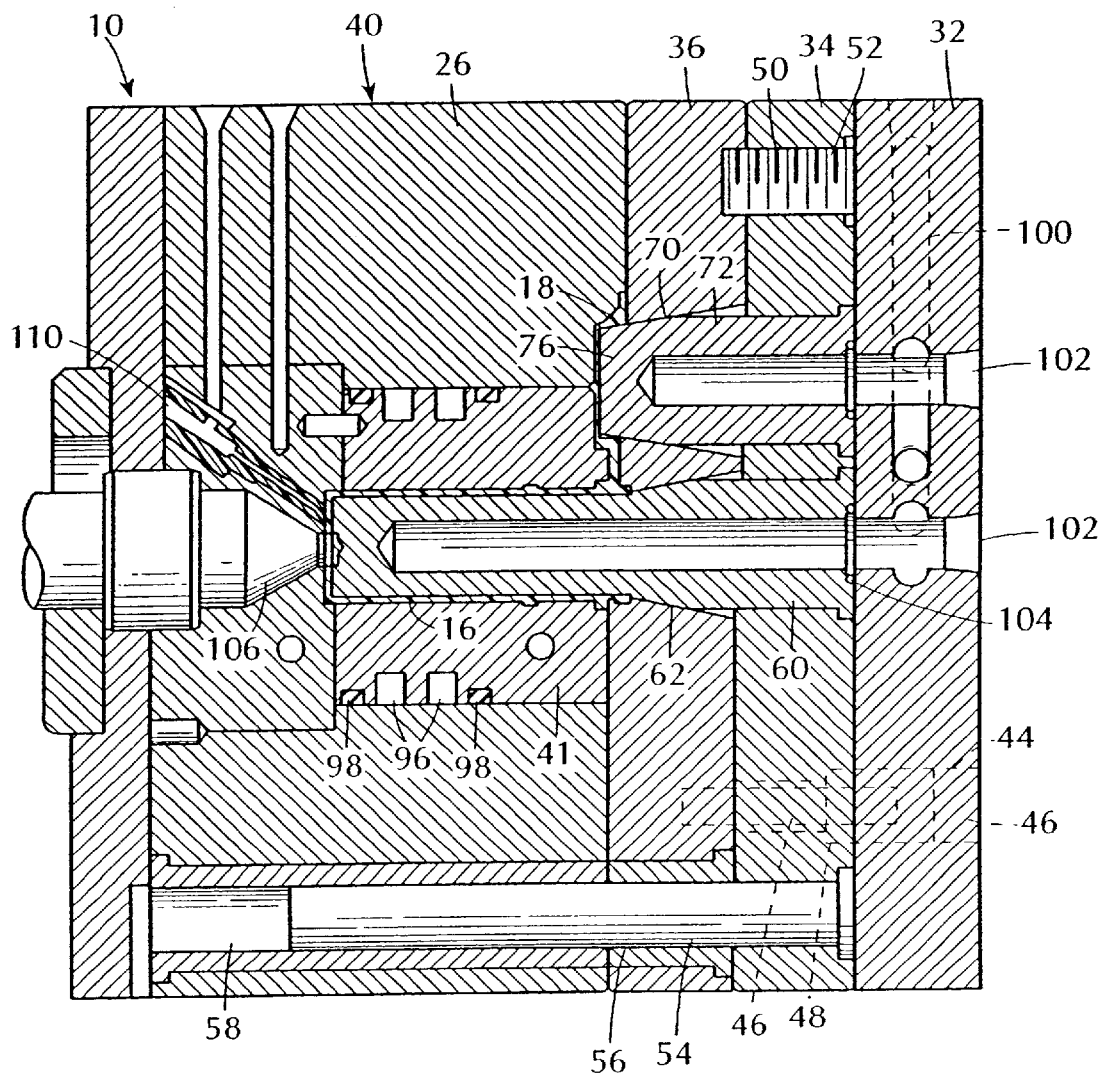
FIG. 3 is a side view, in a partial cross section of one embodiment of mold of the present invention.
Figure 4:
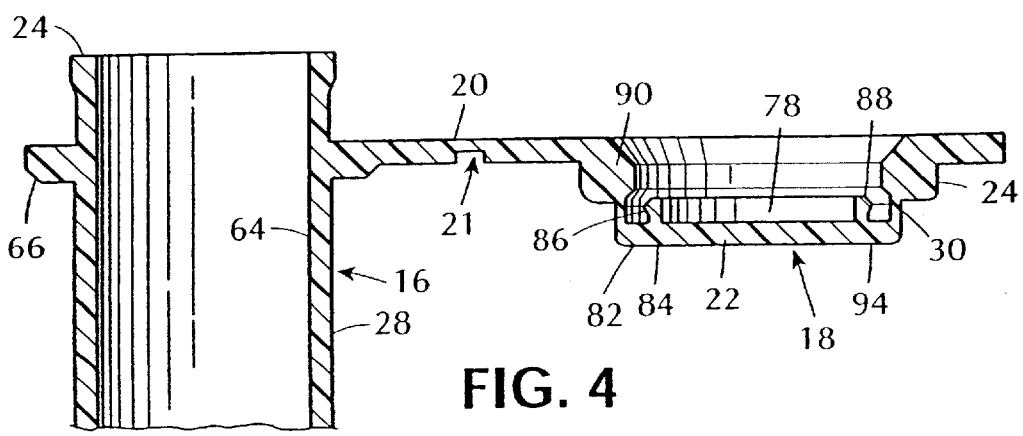
FIG. 4 is a cross-sectional view of one embodiment of a body and cap of the present invention.

As an illustrative example, the vial 16, as shown in FIGS. 3 and 4, may be cylindrical in shape with an integrally formed bottom. A cap 18 is provided which, when closed, forms a leakproof seal. In one embodiment, the cap 18 is integrally connected to the vial 16 with a small flange 20. The vial 16 and cap 18 may be injection molded in a mold 10. Suitable material for the body and cap includes plastic (e.g. thermoplastics such as polyethylene and polypropylene). In another embodiment, the cap 18 includes a circular, flat center portion 22 having a rim 24 extending perpendicularly from the outer edge thereof. The rim is intended to fit over the upper edge of the outer wall of the vial in a sealing manner.

The vial 16 and cap 18 are injection molded using any conventional design known in the art that forms a plastic molded article. In one embodiment of an injection molding process, as partially illustrated in FIG. 3, the end, intermediate and stripper plates 32, 34, 35 are held against the frame of the mold 10 with about 15 fifteen tons of pressure by a press means (not shown). Molten plastic is then injected through the sprue gate 106 with about fifteen tons of pressure so as to form the vial 16 and cap 18. In an illustrative embodiment, the injected vials are allowed to cool for about six seconds while the temperature thereof drops from about 550° F. to about 100°–120° F. The specific temperature to which the vial 16 is formed and the time, prior to opening the mold, is dependent on numerous factors including the type of plastic, and size and type of vial but should be cool enough so that the plastic will retain its shape, and hot enough so that the plastic is not fully set. In one embodiment, water is circulated through the water channels 96, 100, 102 of the mold 10 in order to accelerate the cooling of the vial 16 and cap 18.

In another embodiment, when the vial 16 and the cap 18 are sufficiently cooled, the end plate 32 and the intermediate plate 34 are withdrawn from the frame 40 of the mold 10. As described above, as the end and intermediate plates 32,34 initially move away from the frame 40, the spring 52 acts between the stripper plate 36 and the end plate 32 to hold the stripper plate 36 against the frame 40. After the end and intermediate plates 32,34 have separated from the stripper plate 36 by about one inch, the head 44 of the bolt 42 engages with the shoulder 48 of the chamber 46 within the end and intermediate plates 32, 34 and pulls the stripper plate 36 away from the frame 40. The rods 54 are guided within their respective openings 56 and bores 58 to maintain the three plates 32,34,36 in alignment with the frame 40 during the separation of the plates 32,34,36 from the frame 40. The first and second cores 60,72, being attached to the intermediate plate 34, move away from the frame 40 together with the plates 32,34, 36.

In a particular embodiment, the plates 32,34,36 and the frame are mounted on parallel rails (not shown) so that they remain in an aligned relationship even when the mold is opened. The vial is then ejected from the mold using any conventional design known in the art that completely removes the vial from the mold without incurring damage to either the body or cap. In one embodiment, a jet of air drives an air poppet through its housing until it contacts the vial and pushes it from the mold. When the air poppet is projected into the mold cavity, air currents that drive the air poppet may further assist in ejecting the vial. The air poppet may be provided with an angled surface that will contact the vial in a flat manner so as not to mark the vial. In another example, a mechanical pusher may be employed to contact the vial and push it out of the mold. In a further example, an ejector sleeve may be employed to push the vial out of the mold.

When the vial 12 and cap 14 have been ejected, the plates are returned to the mold by the press to close the mold, and additional plastic is injected into the mold to repeat the cycle.

Although the invention has been described with respect to a particular mold, it should be recognized that other types of molds could be used to form the bodies and caps according to the invention. For example, in the present invention, the process and apparatuses for separating the mold may encompass either the instance where: (a) the cap and vial remain engaged to the female mold part; or (b) the cap and vial remain engaged to the male mold part. As another example, the mold cavity and core may be modified to still accomplish the injection molding process.

With reference to FIG. 1, one embodiment of the present invention includes a hopper 200 for collecting the body and cap that is ejected from the mold, a transfer device 300 for transferring the body and cap from the hopper to the cap closing station 400 and a cap closing station 400 for sealing the cap to the body.

After the vial 16 is completely ejected from the mold, the vial 16 communicates with a transfer device 300. In one embodiment of the method of communicating with the transfer device as shown in FIG. 1, the vial 16 is gravity fed to a collection device 200 such as a hopper that is connected to the transfer device 300. Such methods of gravity feeding may include directly dropping the vial 16 and cap 18 into a collection device, or a chute or a conveyor that directs the vial 16 to the collection device or to the transfer device 300. To assist in the direction of the vial 16, the chute or conveyor may also include an additional mechanical device such as a belt, or air pneumatics. In another embodiment, the vial 16 may be ejected out of the mold 10 directly into a collection device 200 such as a hopper or other types of container that collects one or more vials that is located below the mold.

The transfer device 300 may be any device that is used to move the body and cap to the cap closing station. Examples of such transfer devices include belts, rollers, conveyors, apron conveyors, vibrator conveyors, oscillating conveyors, pneumatic conveyors, and roll conveyors. The only limitation as to the configuration of the transfer device is that the device does not damage the sealing surface of the body and cap.

The transfer device must be a mechanical device and thus, does not include using only a human (e.g. hand(s) of a human) to transfer the vial 16 and cap 18 to either the collection device 200 or directly to the cap closing station 400.

In one embodiment, as partially shown in FIG. 1, the vial 16 is correctly oriented in the transfer device 300 by rollers 310 on each side of the vial 16. For example, the rollers may be: (a) two flat cylinders that are parallel to each other; (b) spaced apart a distance approximately equal to the diameter of the vial; (c) set on a decline from the hopper to the cap closing station; and (d) rotated so that one roller is rotating in the clockwise direction and the other roller rotating in the counter-clockwise position. As such, the vial 16 is discharged from the bottom of the hopper 200 and the rollers 310 on each side of the vial 16 rotate to both correctly orient the vial 16 with the body in the upright position (the cap is properly oriented in the loading position of the cap closing station) and to move the vial 16 from the hopper 200 to the cap closing station 400. In a more specific embodiment, hopper 200 is designed to vibrate so that one or more vials will freely flow out of the hopper. The configuration of the hopper 200, the transfer device 300 and the cap closing station 400, as shown in FIG. 1, is for illustration purposes, and thus other configurations may be used without departing from the scope of the invention.

In order to provide a seal between the cap and the vial which is leakproof, the cap 18 must be mated with the vial rim 26 when the plastic is not fully set. The sealing of the cap to the vial while the plastic is not fully set allows the cap and vial to conform to each other and to form the required leakproof seal. However, the cap cannot be placed on the vial until the plastic has cooled enough so that the cap and vial will not melt into one another. Sealing of the cap too soon will cause the cap to be permanently fixed and unremovable. It is necessary to remove the vial from the mold and move it to the cap closing station within a particular window of time while to the plastic is not fully set. This window of time will vary for different materials, and different sizes and shapes of containers. For example, in one embodiment, the amount of time before the material is not fully set may be in the range of about 1 to about 10 minutes.

Figure 2:
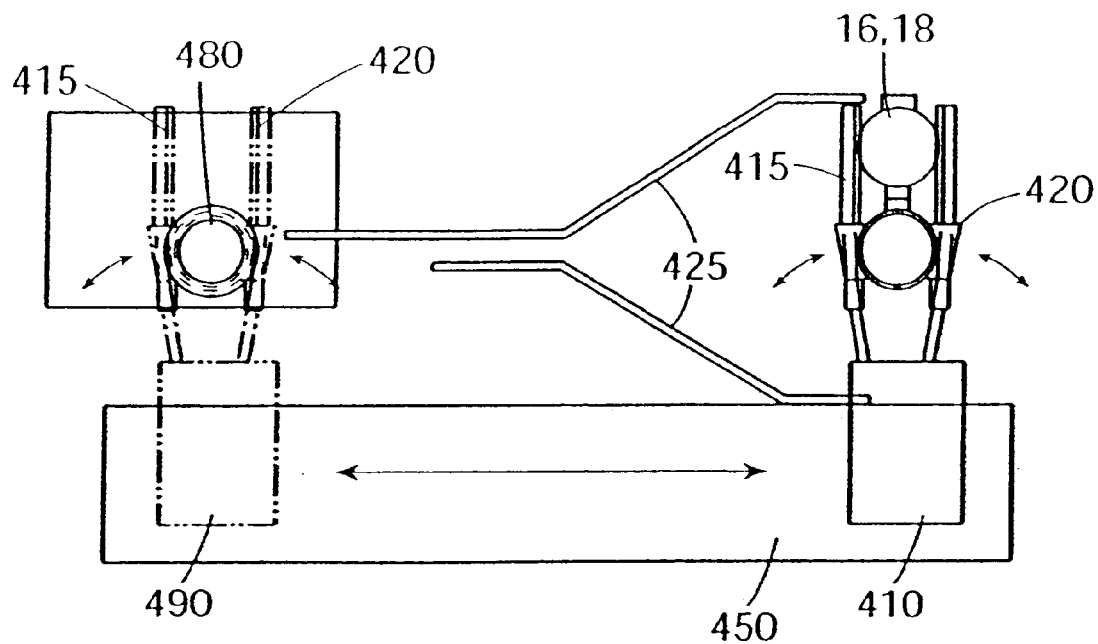
FIG. 2 is a top view of one embodiment of the present invention showing a cap closing station.

The cap closing station 14, as illustrated in FIG. 2, is used to close the cap 18 onto the vial 16 within the window of time where the plastic is not fully set. In the embodiment shown in FIG. 2, the open vial (body 16 and cap 18) is transferred to the loading position 410 where the vial is correctly oriented in the loading position 410. Gripper jaws 415 and 420 lock the vial 16 into place. Sufficient force is exerted by the gripper jaws 415, 420 on the vial 16 to hold the vial 16 in place while vial 16 is horizontally moved to the cap closing position 490 but, at the same time, the force on the vial must be regulated so as to avoid causing damage to the body 16 and cap 18 of the vial. Open vial 16 and cap 18 are moved from position 410 to position 490 by a slide 450. While vial 16 moves horizontally from position 410 to position 490, cap 18 slides over passive guide 425 that causes cap 18 to move from a fully open position (shown in FIG. 4) to a substantially closed position by flexing the flange at point 21 (of FIG. 4) that connects the cap to the body so as to ensure the proper alignment of the cap on the upper edge 26 (of FIG. 4) of the body. Once vial 16 and located at position 490, cylinder 480 (which is directly above vial 16 and located at position 490) is actuated to contact the outside surface of the cap and to apply sufficient downward force on the cap to completely and evenly seal the cap to the body. Subsequently, cylinder 480 backs-off of contacting the surface of the cap. Gripper 415 and 420 open and the sealed vial is discharged from the cap closing station at position 500. Suitable methods of discharging the sealed vial from the cap closing station include, but are not limited to, a flipper, lever, mechanical pusher or controlled airjets.

In another embodiment, cylinder 480 may be a flipper or other mechanical devices that applies sufficient downward pressure on the outside surface of the cap to seat completely and evenly the cap to the body. In yet another embodiment, gripper jaws 415, 420 may also be other devices that apply sufficient force to lock the body but does not cause deformation to the body or cap or otherwise puncture the body.

In a further embodiment, the passive guide 425 (which does not move) may also be an "active" guide that moves to assist in proper flexing the flange at point 21 so that the cap moves from a fully open position to a substantially closed position.

In another embodiment of the cap closing station 400, the body and cap is locked into a stationary position and a rotary flipper or comparable device moves the cap from the open position to the closed and sealed position and ensures that the flange properly flexes at point 21 so that proper alignment is maintained when the cap contacts the upper edge 26 of the body and then subsequently applies downward force on the outside surface of the cap to completely and evenly seat the cap on the body.

In a further embodiment where the upper portion of the body is locked in the cap closing station, the flange connecting the cap to the body may be flexed (e.g. pivoted) so as to bend the flange at point 21 prior to entering the cap closing station. By doing so, the proper bend in the flange is maintained while the body and cap proceeds along the passive guide 425 of the cap closing station from point 410 to point 490. In another embodiment, the body is locked at two locations within the cap closing station 400—at the bottom of the vial and at the upper portion of the body (i.e. below the sealing surface). In this way, a sufficient amount of force may be exerted at the bottom of the body to lock the body into the cap closing station without causing deformation to the body. Consequently, sufficient force need only be exerted at the upper portion of the body to maintain alignment of the vial through the passive guide from point 410 to point 490 without causing any deformation to the body. In one embodiment, the operation of the gripper 415, 420, slide 450 and cap closing device 480 may be operated by pneumatic cylinders (not shown). However, it should be recognized that a mechanical mechanism could also be used to operate these devices.

In one embodiment, after the cap is closed in the cap closing station, a conveyor for transporting cartons is positioned below the cap closing station so that the sealed vials may be dropped directly into the cartons. For example, the vial may be ejected from the cap closing station in response to a signal from the sensor, to drop the sealed vial into the awaiting carton.

In yet another embodiment of the design of the cap and vial as shown in FIG. 4, a seal 82 and the cap rim 90 combine to form an annular region for interlocking with the vial 16. However, the present invention is not limited to the design detailed in FIG. 4 and thus, may include various modifications of the seal design. Consequently, specific dimensions used throughout this specification are exemplary and are only intended to illustrate relative sizes of the various elements and not in any way to limit the present invention to the particular disclosed dimension or operating parameters.

The present invention will be illustrated in greater detail by the following example. It is understood that this example is given by way of illustration and is not meant to limit the disclosure or claims. The following example illustrates that, surprisingly, it has now been found that the body 16 and cap 18 may be ejected fully and completely from the mold 10 and gravity fed to a transfer device without affecting the subsequent ability to form a leakproof seal so long as: (a) the body and cap is closed before the material is fully set; and (b) the sealing surface of the body and cap are not damaged. Specifically, after injection molding, polypropylene were ejected from the mold and allowed to free fall from the mold to a carton (approximately 2 feet below the mold). The flange connecting the cap to the body of each vial was then flexed at point 21. Each vial was then placed in the closing device detailed above, and the cap was sealed to the body. Tests were conducted on vials that were sealed at 15 seconds, 30 seconds, 2 minutes and 10 minutes, measured from the time the vial was ejected from the mold. Surprisingly, each and every vial was found to be leakproof.

While the invention has been described in detail with reference to specific embodiments thereof, it will be apparent to one skilled in the art that various changes and modification can be made, and equivalents employed, without departing from the spirit and scope of the invention.

What is claimed is:

1. A process comprising the steps of:
   (a) injecting a molten plastic material into a mold cavity to form a molten body and cap, wherein the cap is integrally connected to the body with a flange;
   (b) after step (a), opening the mold cavity;
   (c) after step (b), ejecting the body and cap completely from the mold before the material is fully set;
   (d) after completely ejecting the body and cap from the mold, communicating the body and cap with a transfer device, wherein the transfer device is not in the mold;
   (e) transferring the body and cap with the transfer device to a cap closing station;
   (f) orientating the body and cap so that the cap is orientated in a position for sealing with the body; and
   (g) sealing the cap to the body in the cap closing station before the material is fully set.

2. The process of claim 1 wherein the sealing of the cap to the body forms a leakproof seal.

3. A process comprising the steps of:
   (a) injecting a molten plastic material into a mold cavity to form a molten body and cap, wherein the cap is integrally connected to the body with a flange;
   (b) after step (a), opening the mold cavity;
   (c) after step (b), ejecting the body and cap completely from the mold before the material is fully set;
   (d) after step (c), gravity feeding the body and cap into a collection device;
   (e) transferring the body and cap with a transfer device from the collection device to a cap closing station;
   (f) orientating the body and cap so that the cap is orientated in a position for sealing with the body; and
   (g) sealing the cap to the body in the cap closing station before the material is fully set.

4. The process of claim 3 wherein the sealing of the cap to the body forms a leakproof seal.

5. An apparatus comprising:
   a mold having a mold cavity;
   a device for injecting a molten plastic into the mold cavity to form a body and a cap, wherein the cap is integrally connected to the body with a flange;
   a device for opening the mold;
   an ejecting device cooperating with the mold opening structure to completely eject the body and cap from the mold before the material is fully set and without causing damage to the sealing surfaces on the body or cap;
   a transfer device for transferring the body and cap to a cap closing station after the body and cap have been completely ejected from the mold, wherein the transfer device is configured to move the body and cap without incurring damage to either the body or cap and wherein the transfer device is located externally from the mold;
   an orientation device that contacts at least the body so that the cap is orientated in a position for sealing with the body
   a cap closing station to seal the cap to the body while the body and cap are not fully set to form a leakproof seal.

6. The apparatus of claim 5 wherein the cap closing station seals the cap to the body to form a leakproof seal.

7. An apparatus comprising:
   a mold having a mold cavity;
   a device for injecting a molten plastic into a mold cavity to form a body and a cap, wherein the cap is integrally connected to the body with a flange;
   a device for opening the mold; an ejecting device cooperating with the mold opening structure to completely eject the body and cap from the mold before the material is fully set and without causing damage to the sealing surfaces on the body or cap;
   a collection device for receiving the body and cap that is gravity fed from the mold and for containing at least one body and cap;
   a transfer device for transferring the body and cap from the collection device to a cap closing station, wherein the transfer device is configured to move the body and cap without incurring damage to the sealing surfaces on the body or cap and wherein the transfer device is located externally from the mold;
   an orientation device that contacts at least the body so that the cap is orientated in a position for sealing with the body; and
   a cap closing station to seal the cap to the body while the body and cap are not fully set to form a leakproof seal.

8. The apparatus of claim 7 wherein the cap closing station seals the cap to the body to form a leakproof seal.

* * * * *